United States Patent [19]
Jorritsma

[11] Patent Number: 5,182,951
[45] Date of Patent: Feb. 2, 1993

[54] METHOD AND APARATUS FOR CALCULATING FLOW RATES THROUGH A PUMPING STATION

[76] Inventor: Johannes N. Jorritsma, 37 Yonge St. N.,, Aurora, Ontario, Canada L4G 1N6

[21] Appl. No.: 593,644

[22] Filed: Oct. 4, 1990

Related U.S. Application Data

[60] Continuation-in-part of Ser. No. 313,458, Feb. 22, 1989, abandoned, which is a division of Ser. No. 148,875, Jan. 27, 1988, Pat. No. 4,821,580.

[51] Int. Cl.⁵ ............................................. G01F 1/00
[52] U.S. Cl. ......................................... 73/861; 73/195
[58] Field of Search ............ 73/168, 195, 861, 961.77, 73/861.78; 417/20, 21, 63

[56] References Cited

U.S. PATENT DOCUMENTS

| | | | |
|---|---|---|---|
| 2,859,616 | 11/1958 | Fellows | 73/195 |
| 3,177,711 | 4/1965 | Ham et al. | 73/861.78 |
| 3,376,744 | 4/1968 | Kister et al. | 73/195 |
| 3,455,162 | 6/1969 | Michener et al. | 73/861.78 |
| 4,108,574 | 8/1978 | Bartley et al. | 417/20 |
| 4,248,194 | 2/1981 | Drutchas et al. | 417/20 |
| 4,467,657 | 8/1984 | Olsson | 73/861 |
| 4,530,247 | 7/1985 | Haas | 73/861 |

FOREIGN PATENT DOCUMENTS 2077434 12/1981 United Kingdom .................. 73/861

Primary Examiner—Herbert Goldstein
Attorney, Agent, or Firm—Shoemaker and Mattare, Ltd.

[57] ABSTRACT

A method and apparatus is provided for calculating the flow rate through a pumping station that has at least one pump. For each pump and for each combination of pumps on oscillator circuit is provided of which the output frequency can be adjusted. The frequency of each such circuit is adjusted to represent the pump rate for the pump or combination of pumps to which that oscillator circuit corresponds. While operating the pumping station, a totalizing device has fed to it the output frequency of that oscillator circuit which corresponds to the pump or combination of pumps which is operating at any given time, and the total in the totalizer is incremented by a given amount for each pulse encountered. Thus, the totalizer is continuously updated.

6 Claims, 5 Drawing Sheets

METHOD AND APARATUS FOR CALCULATING FLOW RATES THROUGH A PUMPING STATION

This is a Continuation-in-Part of U.S. patent application Ser. No. 313,458, filed on Mar. 22, 1989 now abandoned, which in turn is a divisional of U.S. patent application Ser. No. 148,875, filed on Jan. 27, 1988 now U.S. Pat. No. 4,821,580.

This invention relates generally to a method and apparatus for calculating flow rates through a pumping station, and has to do particularly with a method and apparatus for accurately determining the rate at which sewage and the like is pumped through a pumping station in a sewage handling system.

BACKGROUND OF THIS INVENTION

In my previous U.S. Pat. No. 4,455,870, issued on Jun. 26, 1984, a means is provided to measure flow through a pumping station utilizing constant speed pumps which cycle on and off. Typically, a pump will start pumping when the wet well reaches a "high" level, and will cease pumping when the wet well reaches a "low" level.

In my previous patent just mentioned, the determination of inflow during a pumping phase is accomplished by first determining the inflow rate over a single time segment closely preceding the pumping phase, and then extrapolating this calculated inflow over the duration of the pumping phase.

There are pumping stations where the system set forth in my above U.S. patent cannot be used, because the pumping stations utilize a plurality of pumps which are adapted to work either singly or in combinations. In such installations, a pumping phase may last too long to allow one to legitimately extrapolate a previously calculated inflow rate over the entire pumping phase.

Other approaches to the calculations of total flow through a pumping station are represented by the following prior art, of which the applicant is aware:

U.S. Pat. No. 2,859,616, issued Nov. 11, 1958, Fellows;

U.S. Pat. No. 3,376,744, issued Apr. 9, 1968, Kister et al;

U.S. Pat. No. 3,455,162, issued Jul. 15, 1969, Michener et al;

U.S. Pat. No. 3,177,711, issued Apr. 13, 1965, Ham et al;

U.S. Pat. No. 4,108,574, issued Aug. 22, 1978, Burtley;

U.S. Pat. No. 4,248,194, issued Feb. 3, 1981, Drutchas et al;

U.S. Pat. No. 4,467,657, issued Aug. 28, 1984, Olsson;

U.K. patent 2 077 434, published Dec. 16, 1981, Miller.

GENERAL DESCRIPTION OF THIS INVENTION

Generally this invention aims to improve the accuracy of measurement of the flow rate through a pumping station utilizing one or a plurality of pumps adapted to work individually or in combinations, and in which the duration of a total pumping phase tends to be too long to allow a previously measured inflow rate to be extrapolated reliably over the entire pumping phase. The invention to which the appended claims are directed is particularly suitable for installations that utilize pumps having relatively "steep" pump curves in which there is little variation of pump capacity with small variations in differential pressure across the pump. This invention is also particularly useful for pumping stations in a sewage handling system, because it does not require sensors, venturies or flow-measuring vanes to be in direct contact with the pumped liquid.

Again generally, this aim is accomplished by providing one or more oscillator circuits of which the output frequency may be adjusted, with each such circuit representing a given pump or combination of pumps that may be in operation. The individual circuit frequencies correspond to the pumped output, and means are provided to feed the various outputs to a totalizer.

More specifically, this invention provides a method of calculating the flow rate through a sewage handling system pumping station having at least one sewage pump, comprising the steps:

a) for each sewage pump and for each combination of sewage pumps, providing a stand-alone oscillator circuit of which the output frequency may be manually adjusted, each circuit frequency being adjustable independent of its corresponding sewage pump or combination of sewage pumps, b) prior to operating said pumping station, adjusting the output frequency of each oscillator circuit to represent the pump rate for the sewage pump or combination of sewage pumps to which that oscillator circuit corresponds, c) while operating the said pumping station, feeding to a totalizing device the output frequency of that oscillator circuit which corresponds to the sewage pump or combination of sewage pumps which is operating at any given time, and d) incrementing the total in the totalizing device by a given amount for each pulse encountered, whereby the totalizing device is continuously updated.

Further, this invention provides, in a method for calculating the flow rate through a sewage handling system pumping station having at least one sewage pump and a totalizing device, the improvement which comprises:

a) providing for each sewage pump and for each combination of sewage pumps a stand-alone oscillator circuit of which the output frequency may be manually adjusted, each circuit frequency being adjustable independent of its corresponding sewage pump or combination of sewage pumps, b) prior to operating said pumping station, adjusting the output frequency of each oscillator circuit to represent the pump rate for the sewage pump or combination of sewage pumps to which that oscillator circuit corresponds, c) while operating the said pumping station, feeding to the totalizing device the output frequency of that oscillator circuit which corresponds to the sewage pump or combination of sewage pumps which is operating at any given time, and d) incrementing the total in the totalizing device by a given amount for each pulse encountered, whereby the totalizing device is continuously updated.

Finally, this invention provides apparatus for calculating the flow rate through a sewage handling system pumping station having at least one sewage pump, comprising:

for each sewage pump and for each combination of sewage pumps a stand-alone oscillator circuit having an output frequency, the oscillator circuit frequency being adjustable independent of its corresponding sewage pump or combination of sewage pumps, first means for adjusting the output frequency of each oscillator circuit to represent the pump rate of the sewage pump or combination of sewage pumps to which that oscillator circuit corresponds, a totalizing device, second means for feeding to said totalizing device the output frequency of that oscillator circuit which corresponds to the sewage pump or combination of sewage pumps which is operating at any given time, and computing means by which the total in the totalizing device is incremented by a given amount for each pulse encountered, whereby the totalizing device is continuously updated.

GENERAL DESCRIPTION OF THE DRAWINGS

The invention will now be described in greater detail with the aid of the accompanying drawings, in which.

DETAILED DESCRIPTION OF THE DRAWINGS

In order to permit a clear grasp of the subject matter to which the appended claims are directed, it will be useful to describe the system to which the claims of the above-mentioned U.S. patent application Ser. No. 148,875 are directed.

Figure 2:
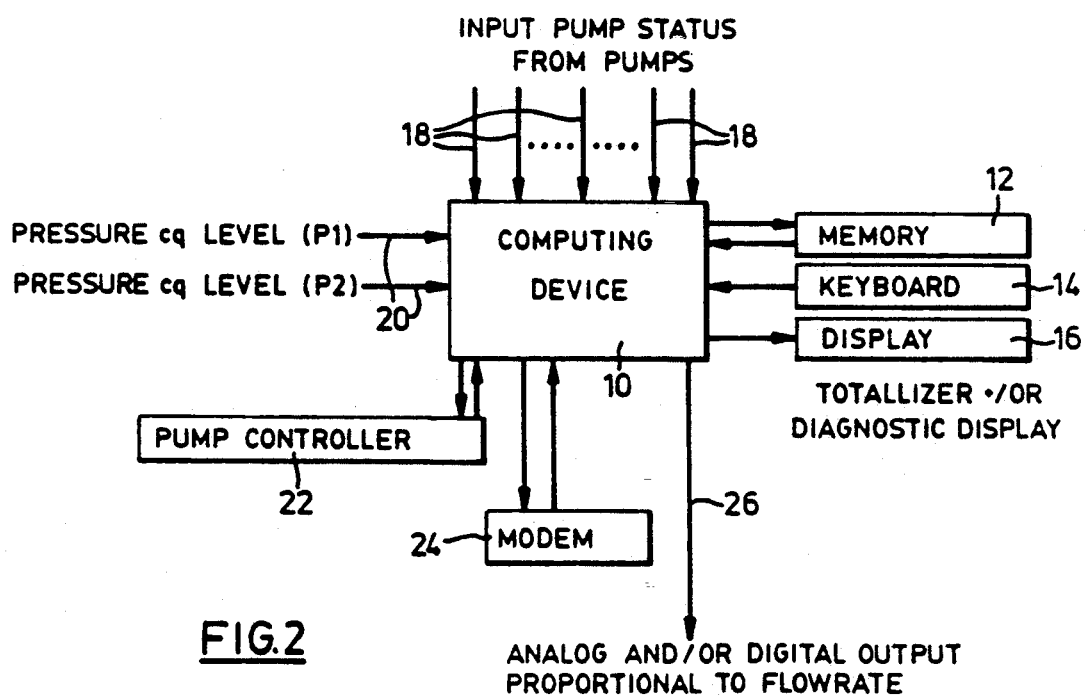
FIG. 2 is a block diagram showing the major components of a computing system used in the combination to which the above-mentioned parent U.S. patent application Ser. No. 148,875 is directed.

Attention is first directed to FIG. 2, which shows a computing device 10 with connections to a memory 12, a keyboard 14 and a display 16. The computing device 10 also receives inputs 18 to indicate the pump status (on or off in the case of a constant speed pump), and inputs 20 which provide information about the pressure differential across the or each pump. The computing device 10 also interfaces, if necessary, with a pump controller 22 and a modem 24. Also if desired, a separate output 26 may be provided, which is proportional to the flow rate and is in analog or digital form.

Figure 1:
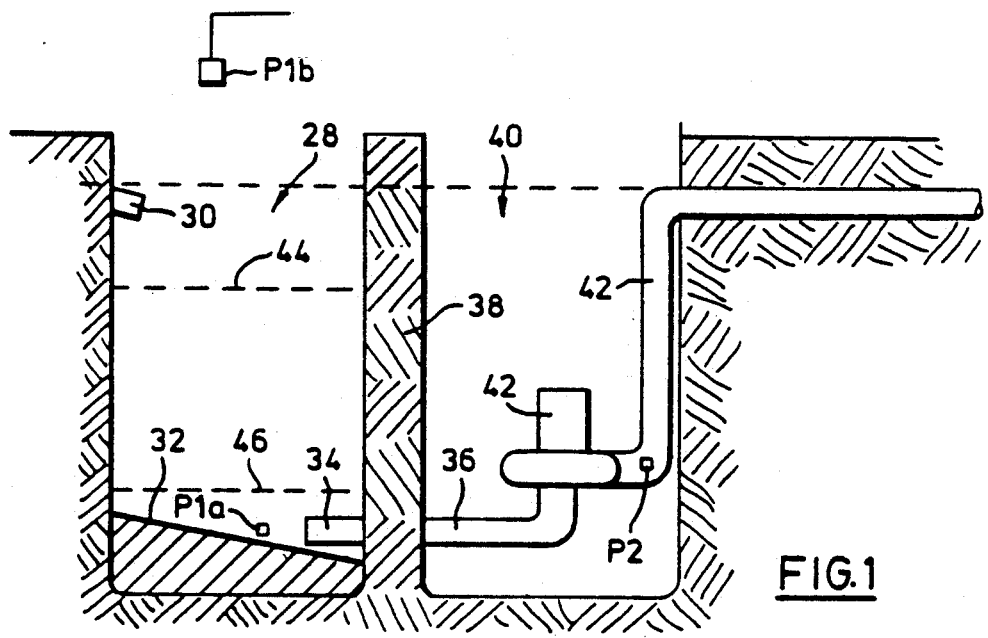
FIG. 1 is a vertical sectional view, shown somewhat schematically, through a pumping station which includes a wetwell and a pump.

Attention is now directed to FIG. 1, which shows a wet well 28 which receives sewage or liquid through an inlet conduit 30. The wet well 28 has a sloping bottom 32 to ensure that all materials entering the wet well will tend to migrate to one particular location. In that location is the intake end 34 of a suction conduit passing through a partition 38 to a pump chamber 40. In the pump chamber 40 is a pump 42 which delivers pumped sewage or liquid to an output conduit 42. A sensor P2 is located immediately downstream of the pump 42, and senses the back pressure which is seen by the pump. The pressure at the suction side of the pump 42 can be calculated on the basis of the level of sewage in the wet well 28, and therefore a sensing means can be provided to simply determine the level of the contents of the wet well 28. This may be done by providing a pressure sensor P1a at the bottom of the wet well 28, operating, for example, on the bubbler principle, or alternatively it can be accomplished by providing an ultrasonic sensor P1b above the highest level of sewage in the wet well 28, the sensor P1b being adapted, at regular intervals, to emit an ultrasonic signal, which bounces off the surface of the liquid and then is received again at the sensor P1b. The lapse of time between sending and receiving can be calculated and used to determine the level of liquid in the wet well 28. Normally, sensors such as that shown at P1b provide a first electronic signal when the ultrasonic burst is sent, and a second electronic signal when the echo is received. A conventional analog to digital converter can then be used to convert the lapse of time between the electronic signals to a specific number, which can then be fed to the computing device.

Contained in the memory 12 is a look-up table (the equivalent of a curve) which describes the pump capacity versus the differential pressure across the pump, which is usually referred to as relative head height. The table in the memory can be based on the pump capacity curve usually supplied by a manufacturer for a given pump, or alternatively it can be empirically established by running a series of tests at different specific pressure differentials. Such empirically established data can be produced by "calibration run" during which the pump or pumps are operated manually or in accordance with a pre-set program in the computing device.

The computing device controls a running total in the memory 12, which may be called a totalizer, and this total is updated on a regular basis by the computing device 10. Of course, the computing device 10 only needs to update the totalizer when one or more pumps are running.

In operation, assuming that the wet well 28 is continuously receiving sewage at a variable rate, and that the pump 42 is cycling on and off, turning on when the liquid level in the wet well reaches a predetermined upper limit 44 and turning off when the level reaches a predetermined lower limit 46, the computing device 10 carries out the following steps:

Firstly, the pressure upstream of the pump 42, as indicated by the sensor P2, and the pressure downstream of the pump 42, based on the level of liquid in the wet well 28, are both determined at a given point in time. From this data, the computing device 10 derives the pressure differential across the pump 42, and then consults the table in the memory 12 to learn the pumping rate for the pump. The computing device 10 then calculates the volume pumped during the time interval between the current time point and the immediately preceding time point by multiplying the determined pumping rate by the length of the time interval. Finally, the totalizer in the memory 12 is updated by adding in the calculated volume pumped during the respective interval.

This same sequence of computations is carried out at sequential points of time, which may be either at equal intervals, as initiated by a timer function incorporated into the computer, or on the basis of a change in pump status and/or a change in the pressure differential that is greater than a predetermined amount. Again, when the pump is not running, a separate function would override and cancel the computation.

In the event that the pumping station has a plurality of constant speed pumps, the memory 12 would store, for each pump, a table representing or correlating pumping rate with respect to pressure differential, and the computing device would accomplish the various calculations for each pump. Normally, when plural pumps are provided, the level of sewage in the wet well is controlled by phasing in the pumps one after the other, as needed. Thus, there will be a lead or first pump which would operate whenever pumping is called for. A second pump could be phased in only when the lead pump is not able to cause the liquid level to descend. A third pump may also be provided, and so on.

Figure 3:
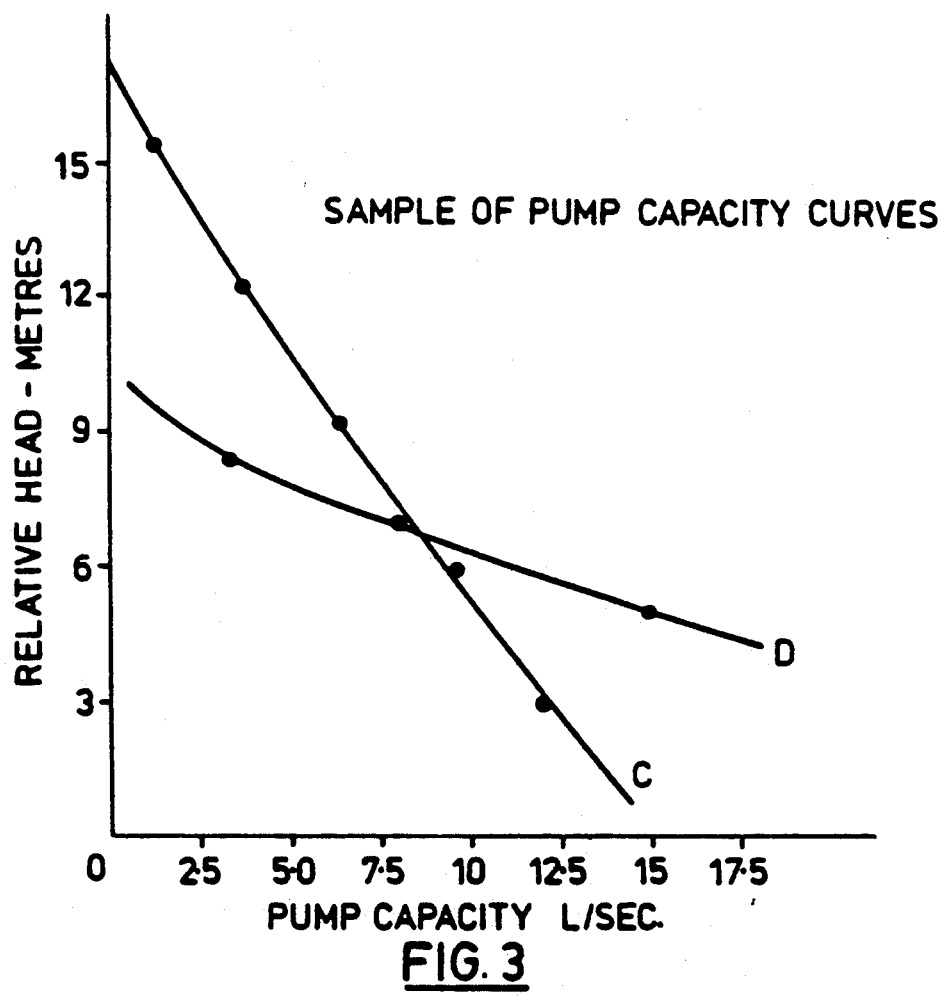
FIG. 3 is a representative graph showing two possible pump capacity curves.

FIG. 3 is a typical graph showing pumped capacity versus relative head height for two different pumps C and D.

The system just described can readily be re-configured for variable speed pumps, so that the inputs become analog or digital inputs of pump speeds. For example, a zero pump speed indication will show that a pump was off. The above-mentioned parent U.S. patent application Ser. No. 148,875 deals with both constant speed and variable speed pumps in the context just described.

THE PRESENT INVENTION

Figure 5:
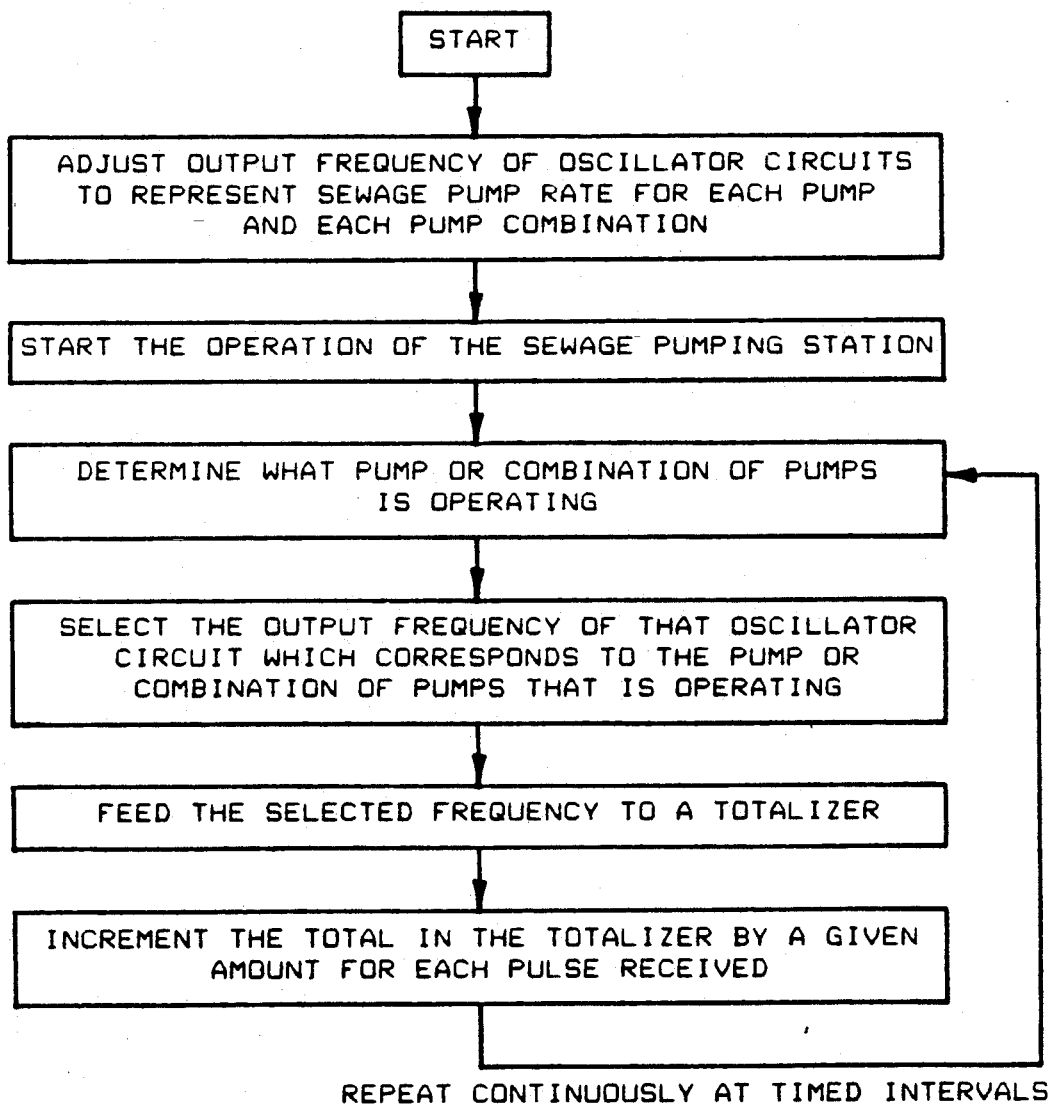
FIG. 5 is a flow chart of the method claimed in this application.

The system to be described and claimed in this application is one in which a totalizer can be up-dated continually, rather than at timed intervals. In this system, there is provided a multiplicity of channels, one for each pump and each combination of pumps. Each channel incorporates an oscillator circuit, and each oscillator circuit incorporates a variable resistance which converts the circuit into an adjustable analog memory means. The frequency of any given circuit is adjusted, by means of the variable resistance, so that it correlates with or represents the pumping rate of the pump or combination of pumps to which that particular oscillator circuit corresponds. Then, when the pumping station is being operated, the number and identity of the pumps pumping is determined, which in turn determines the channel to be accessed As seen in FIG. 5, the system loops through a given sequence (D to G) at regular intervals, preferably on the order of one second. The particular frequency of that channel is then fed to a totalizer which accepts the input frequency. The totalizer increments its display by a given amount (for example unity) for each pulse received. In this manner, the totalizer is continually up-dated.

A central computer can handle this entire operation, by receiving inputs from the "pump on" detectors. A look-up function programmed into the computer would allow the computer to know which channel to reference for each combination of pumps or each individual pump.

This invention is particularly suitable for the special case where the individual pumps have a relatively "steep" pump curve (such as C in FIG. 3), where there is little variation of pump capacity with small variations in differential pressure. In such a case, an average pump capacity (or combination capacity) may be picked for each pump or combination, thus requiring the computer to know only which pump or which combination of pumps is running, whereupon it picks the oscillator output that corresponds.

Circuit Description

Figure 4A:
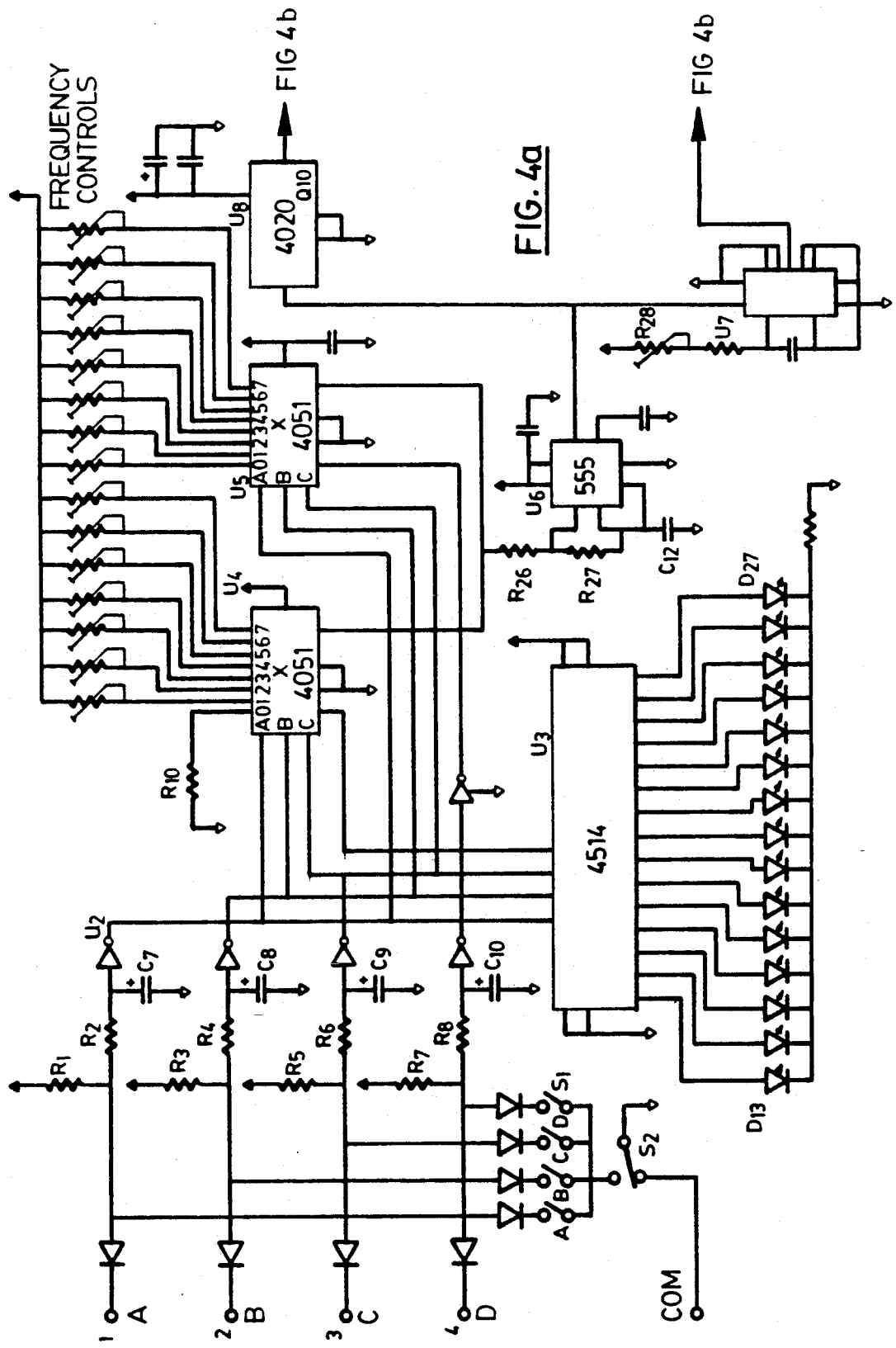
FIGS. 4a-4c are circuit diagram of an oscillator circuit useful in the combination to which this application is directed.
Figure 4B:
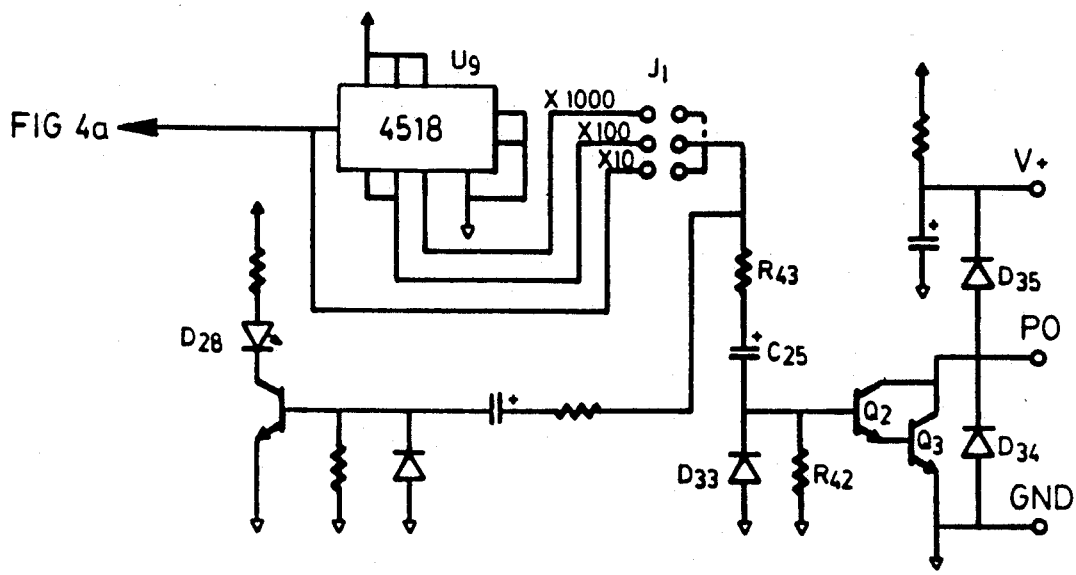
Figure 4B:
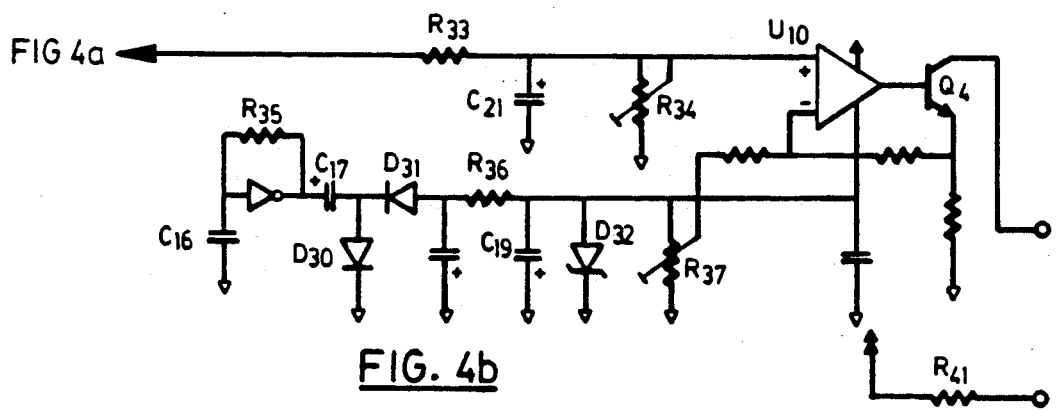
Figure 4C:
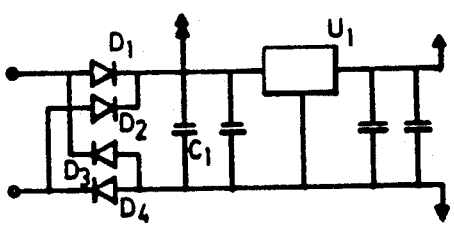

Attention is now directed to FIGS. 4a-4c, for a detailed description of a suitable oscillator circuit.

External inputs to the circuit come onto the board through terminal numbers 1, 2, 3 and 4. R1, R3, R5 and R7 pull the inputs up to V+. R2, R4, R6 and R8 along with C7, C8, C9 and C10 provide input protection for U2. Switches S1 A, B, C, D and S2 provide a means of calibrating the system by disconnecting the relay inputs and simulating external inputs. U2 is a hex inverting schmitt trigger which converts the active low A, B, C, D inputs to active high signals to drive U3, U4, and U5. U4 and U5 are 8-channel analog multiplexers. The inputs to the A, B, C pins of these devices determine which X0-X7 input is routed to the X output. When input A is high then X1 is routed to X. If input B is high then X2 is routed to X and so on in a binary counting fashion. External input D determines whether U4 or U5 is active. The 7 X inputs of U4 and the 8 X inputs of U5 are connected to 15 individual pots. The setting of each of these pots determines the frequency of the oscillator when a particular pot is active. Input X0 of U4 is connected to ground through R10 so that when this input is selected the oscillator stops. The active pot is indicated by an LED (D13-D27) which is activated by U3, which is a 4 to 16 line decoder. The oscillator is based on U6 which is a 555 timer chip. R26, R27 and the selected pot, along with C12 determine the output frequency of the 555. The output frequency can be adjusted over the range of approximately 180 Hz to 22 KHz. The status of the A, B, C, D inputs determine the oscillator frequency. The output of U6 is applied to clock input of U8. U8 is a 14-bit binary counter which is being utilized as a frequency divider. The Q10 output of U8 gives a frequency division of 1024. The output of U8 is applied to the clock input of U9. U9 is a dual BCD counter which is configured to divide by 10 and 100. The output from U8 along with the two outputs from U9 gives three frequency division ratios of X10, X100 and X1000. The different ratios are selected using jumper block J1. With J1 in the X10 position the output pulse range is position the output pulse range is 0.02 pps to 2 pps. With J1 in the X1000 position the output pulse range is 0.002 pps to 0.2 pps. The output from J1 is applied to the output pulse circuit made up of R43, R42, C25, D33, Q2 and Q3. This network makes sure that Q3 is pulsed on for approximately 0.05 seconds for each complete cycle from J1. Diodes D34 and D35 provide inductive kickback protection for Q3. The output from J1 is also applied to another pulse circuit to drive LED D28 to provide a visual indication of the output pulse rate. The output from the main oscillator is also applied to a circuit to provide a 4 to 20 mA indication of the master oscillator frequency. The output from U6 is applied to the clock input of U7 which is a monostable one-shot. The active output from U7 has a constant pulse width so that the duty cycle of the U7 output varies as a function of the input frequency. The pulse width output is set by R28 so that at maximum frequency input the duty cycle is approaching 100%. This varying duty cycle output is applied to a low pass filter circuit made up of R33 and C21 which converts the duty cycle output to a corresponding DC voltage. This voltage is scaled by R34 and then applied to U10 which is an op-amp configured to operate as a voltage to current converter. Q4 acts as the current sink for the 4 to 20 mA loop. The positive supply for this loop is higher than the circuit supply so that 20 mA can be supplied through loop resistances as high as 1000 ohms. Resistor R41 provides over current protection in the event this output is inadvertently grounded. The negative bias supply for U10 is obtained using the voltage invertor circuit based around one section of U2. R35 along with C16 cause the one section of the U2 to oscillate at approximately 20 KHz. This output is then applied to the negative voltage generator circuit made up of C17, D30, D31 and C19. This negative voltage (approx. −V) is then regulated by the R36, C19 and the zener D32 combination to −5 V. R37 provides for adjustment of the 4 mA offset current. The AC or DC power comes onto the board on terminal pins 8 and 9. The AC is full wave rectified by D1-D4 and filtered by C1. U1 is a posltive 12 V regulator IC which provides the circuit power. DC power can also be applied to terminal pins 8 and 9 with no polarity considerations. The DC voltage must be in the range of 24 V to 32 V. Voltages down to 16 VDC can be used with a corresponding drop in the maximum loop resistance of the current loop.

Below is a table which lists the maximum current loop resistance for various power supply input voltages.

| Vin DC | Max R |  |
|--------|-------|---|
| 16 | 560) | |
| 18 | 660) | |
| 20 | 760) | |
| 22 | 860) | |
| 24 | 960) | for 20 mA maximum loop current |
| 26 | 1060) | |
| 28 | 1160) | |
| 30 | 1260) | |

With the power transformer supplied and an AC line voltage of 117 V the maximum loop resistance is 1125 ohms.

One of the important advantages of the system just described, as claimed in the appended claims, is that no physical interference in or contact with the actual flow of material is necessary. The electronics merely needs to know which pump or which combination of pumps is in operation at any given time. This is of particular advantage in a sewage treating system, because flow-measuring vanes, venturies and the like will tend to become clogged and rendered inoperative by the solids which tend to be contained in sewage fluid.

In the appended claims, the term "oscillator circuit" is to be taken to include digital means for generating the frequencies.

While one embodiment of this invention has been illustrated in the accompanying drawings and described hereinabove, it will be evident to those skilled in the art that changes and modifications may be made therein, without departing from the essence of this invention as set forth in the appended claims.

The embodiments of the invention in which an exclusive property or privilege is claimed are defined as follows:

1. A method of calculating the flow rate through a sewage handling system pumping station having at least one sewage pump, comprising the steps:
    a) for each sewage pump and for each combination of sewage pumps, providing a stand-alone oscillator circuit of which the output frequency may be manually adjusted, each circuit frequency being adjustable independent of its corresponding sewage pump or combination of sewage pumps,
    b) prior to operating said pumping station, adjusting the output frequency of each oscillator circuit to represent the pump rate for the sewage pump or combination of sewage pumps to which that oscillator circuit corresponds,
    c) while operating the said pumping station, feeding to a totalizing device the output frequency of that oscillator circuit which corresponds to the sewage pump or combination of sewage pumps which is operating at any given time, and
    d) incrementing the total in said totalizing device by a given amount for each pulse encountered, whereby the totalizing device is continuously updated.

2. The invention claimed in claim 1, in which there are at least two sewage pumps in said pumping station, and the totalizing device is incorporated into a computing device.

3. In a method for calculating the flow rate through a sewage handling system pumping station having at least one sewage pump and a totalizing device, the improvement which comprises:
    a) providing for each sewage pump and for each combination of sewage pumps a stand-alone oscillator circuit of which the output frequency may be manually adjusted, each circuit frequency being adjustable independent of its corresponding sewage pump or combination of sewage pumps,
    b) prior to operating said pumping station, adjusting the output frequency of each oscillator circuit to represent the pump rate for the sewage pump or combination of sewage pumps to which that oscillator circuit corresponds,
    c) while operating the said pumping station, feeding to the totalizing device the output frequency of that oscillator circuit which corresponds to the sewage pump or combination of sewage pumps which is operating at any given time, and
    d) incrementing the total in said totalizing device by a given amount for each pulse encountered, whereby the totalizing device is continuously updated.

4. The improvement claimed in claim 3, in which there are at least two sewage pumps in said pumping station, and the totalizing device is incorporated into a computing device.

5. In combination with a sewage handling system, an apparatus for calculating the flow rate through a sewage pumping station having at least one sewage pump, comprising:
    for each sewage pump and for each combination of sewage pumps of said sewage handling system a stand-alone oscillator circuit having an output frequency, the oscillator circuit frequency being adjustable independent of its corresponding sewage pump or combination of sewage pumps,
    first means for adjusting the output frequency of each oscillator circuit to represent the pump rate of the sewage pump or combination of sewage pumps to which that oscillator circuit corresponds,
    a totalizing device,
    second means for feeding to said totalizing device the output frequency of that oscillator circuit which corresponds to the sewage pump or combination of sewage pumps which is operating at any given time, and
    computing means by which the total in the totalizing device is incremented by a given amount for each pulse encountered, whereby the totalizing device is continuously updated.

6. The apparatus claimed in claim 5, in which there are at least two sewage pumps in the said pumping station, and the totalizing device is incorporated into a computing device.

* * * * *